United States Patent
Green (10) Patent No.: US 10,527,197 B2
(45) Date of Patent: Jan. 7, 2020

(54) TRANSFER MECHANISM (71) Applicant: TECHNIP FRANCE, Courbevoie (FR)

(72) Inventor: Andy Green, Invurie (GB)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/038,005

(22) PCT Filed: May 27, 2014

(86) PCT No.: PCT/IB2014/001210
§ 371 (c)(1),
(2) Date: May 19, 2016

(87) PCT Pub. No.: WO2015/075511
PCT Pub. Date: May 28, 2015

(65) Prior Publication Data
US 2016/0298792 A1    Oct. 13, 2016

(30) Foreign Application Priority Data

Nov. 21, 2013   (GB) .................................... 1320600.8

(51) Int. Cl.
*B63B 35/03* (2006.01)
*F16L 1/12* (2006.01)
(Continued)

(52) U.S. Cl.
CPC ............... *F16L 1/207* (2013.01); *F16L 1/235* (2013.01)

(58) Field of Classification Search
CPC ..... F16L 1/12; F16L 1/26; F16L 1/205; F16L 1/225; F16L 1/203; F16L 1/23; F16L 1/166; B63B 35/03

(Continued)

(56) References Cited

U.S. PATENT DOCUMENTS 3,641,778 A * 2/1972 Gibson .................... F16L 1/18
405/168.1
3,776,516 A * 12/1973 Daniel ................... A01K 73/06
254/407

(Continued)

FOREIGN PATENT DOCUMENTS

GB       2 173 760 A       10/1986
GB       2173760 A  *    10/1986   .............. F16L 27/00

(Continued)

OTHER PUBLICATIONS

International Search Report dated Feb. 2, 2015 issued in corresponding International patent application No. PCT/IB2014/001210.

(Continued)

*Primary Examiner* — Benjamin F Fiorello
*Assistant Examiner* — Edwin J Toledo-Duran
(74) *Attorney, Agent, or Firm* — Ostrolenk Faber LLP (57) ABSTRACT

A transfer mechanism (28) for transferring a fitting (46) on a flexible tubular conduit (48) about a guiding means (26) of a pipelay tower (20). The transfer mechanism (28) includes a frame (30) adapted to rotate about said guiding means (26); and a clamping mechanism (34) connected to the frame (30) and adapted to connect and secure the fitting (46) to the transfer mechanism (28). Actuation of the transfer mechanism (28) is configured to rotate the frame (30) about the guiding means (26) and cause at least one part of a fitting (46) connected to the transfer mechanism (28) to move along a path outside a surface of the guiding means (26) from a first position upstream of the guiding means (26) to a second position downstream of the guiding means (26).

19 Claims, 9 Drawing Sheets

(51) Int. Cl.
*F16L 1/20* (2006.01)
*F16L 1/235* (2006.01)

(58) Field of Classification Search
USPC ......... 405/158, 166, 167, 168.3, 168.4, 173;
242/54, 158 R; 226/24, 25, 172; 166/63,
166/65, 65 R, 67, 71, 75, 77, 315;
254/175.5, 175.6, 175.7; 191/12.2 R,
191/12.2 A, 12.4
See application file for complete search history.

(56) References Cited

U.S. PATENT DOCUMENTS

| | | | | |
|---|---|---|---|---|
| 3,822,559 | A * | 7/1974 | Matthews, Jr. | F16L 1/225 405/166 |
| 3,982,402 | A * | 9/1976 | Lang | B63B 35/03 405/168.3 |
| 4,003,435 | A * | 1/1977 | Cullen | B65H 51/04 166/385 |
| 4,243,345 | A * | 1/1981 | Cha | F16L 1/203 242/397.3 |
| 4,410,297 | A * | 10/1983 | Lynch | E02F 5/104 242/397.3 |
| 4,594,871 | A * | 6/1986 | de Boer | B65H 57/00 405/166 |
| 4,714,380 | A * | 12/1987 | Coutarel | F16L 27/00 405/168.3 |
| 4,820,082 | A * | 4/1989 | Recalde | F16L 1/202 405/166 |
| 5,348,423 | A * | 9/1994 | Maloberti | F16L 1/19 405/166 |
| 5,573,353 | A * | 11/1996 | Recalde | F16L 1/19 405/168.1 |
| 5,622,451 | A * | 4/1997 | Lupi | F16L 1/15 405/158 |
| 5,950,953 | A * | 9/1999 | Baugh | B65H 75/4402 242/157.1 |
| 6,102,077 | A | 8/2000 | Legallais et al. | |
| 7,090,035 | B2 * | 8/2006 | Lesko | E21B 19/20 175/113 |
| 8,142,107 | B2 * | 3/2012 | Roodenburg | F16L 1/19 405/166 |
| 8,246,273 | B2 * | 8/2012 | Wilson | F16L 1/203 405/166 |
| 2003/0118409 | A1 * | 6/2003 | Lang | F16L 1/23 405/168.1 |
| 2007/0258772 | A1 * | 11/2007 | Bursaux | B63B 35/03 405/166 |
| 2011/0123273 | A1 * | 5/2011 | Feijen | F16L 1/16 405/166 |
| 2011/0286801 | A1 * | 11/2011 | Van Grieken | B63B 35/03 405/166 |
| 2012/0114419 | A1 * | 5/2012 | Pose | F16L 1/19 405/166 |
| 2013/0287498 | A1 * | 10/2013 | Roodenburg | F16L 1/19 405/168.3 |
| 2014/0072370 | A1 * | 3/2014 | Scaini | F16L 1/166 405/173 |
| 2015/0316175 | A1 * | 11/2015 | Konate | H02G 1/06 405/166 |

FOREIGN PATENT DOCUMENTS

| | | |
|---|---|---|
| WO | WO 2009/022177 A2 | 2/2009 |
| WO | WO 2012/091556 A1 | 7/2012 |
| WO | WO 2012/101232 A2 | 8/2012 |

OTHER PUBLICATIONS

International Preliminary Report on Patentability and Written Opinion dated May 24, 2016 issued in corresponding International Patent Application No. PCT/IB2014/001210.
Search Report dated Jun. 2, 2014 issued in corresponding United Kingdom Patent Application GB1320600.8.
Third Party Observation dated Oct. 23, 2014 issued against United Kingdom Patent Application No. GB1320600.8.

* cited by examiner

TRANSFER MECHANISM

CROSS REFERENCE TO RELATED APPLICATIONS

The present application is a 35U.S.C. § 371National Phase conversion of PCT/IB2014/001210, filed May 27, 2014, claiming the benefit of United Kingdom Application no. 1320600.8, filed Nov. 21, 2013, the disclosure of which is incorporated herein by reference. The PCT International Application was published in the English language.

TECHNICAL FIELD OF THE INVENTION

The present invention relates to a transfer mechanism, in particular, a transfer mechanism for transferring a fitting on a flexible tubular conduit.

BACKGROUND OF THE INVENTION

The laying of flexible tubular conduits subsea is usually preformed from a suitable pipe-laying/pipelay vessel such as a floating platform, barge, ship or other vessel. The flexible tubular conduit may be one of many different forms. The flexible tubular conduit is preferably a flexible pipe of the unbounded type for conveying hydrocarbons as defined in the American Petroleum Institute Recommendations API17J "Specification for unbounded flexible tubular conduit". However, the flexible tubular conduit may be of the bonded type. The flexible tubular conduit may alternatively be an umbilical as defined in the American Petroleum Institute API17E "Specification for subsea umbilical" third Edition, 2003. Alternatively, the flexible tubular conduit may be an Integrated Production Bundle (IPB) described in the U.S. Pat. No. 6,102,077 and marketed by the applicant under the registered trademark ISU® (Integrated Subsea Umbilical).

The flexible tubular conduit is stored in a basket or on a reel on the deck of the vessel and in one method is fed from the basket/reel to a vertical pipelay tower, where it is vertically aligned prior to laying the flexible tubular conduit underwater.

Guiding means in the form of an aligner, a chute or a reel is positioned on the top of the pipelay tower and used to divert the flexible tubular conduit from a horizontal path to a vertical path for laying. The guiding means generally comprises a groove, channel or gutter for receiving the flexible tubular conduit and for facilitating the diverting of the flexible tubular conduit from the horizontal path to the vertical path.

The pipelay tower further comprises tensioning means, for example pipe tensioners comprising one or more caterpillar tracks, to facilitate the feeding of the flexible tubular conduit along the required vertical path. In use, the tensioning means grip the flexible tubular conduit and help feed and deploy the flexible tubular conduit towards the seabed.

Before commencing the normal lay of the flexible tubular conduit, the first end of the flexible tubular conduit is engaged on the guiding means located on top of the pipelay tower and appropriately vertically aligned. The first end of the flexible tubular conduit is then guided along the vertical path, often referred to as the 'firing line' and through the tensioning means towards an opening, such a moon pool, on the deck of the vessel.

A normal procedure for getting the first end of the flexible tubular conduit onto the guiding means, and thereafter vertically aligned with the firing line involves the use of a initiation winch to lift the first end of the flexible tubular conduit onto the guiding means.

However, a flexible tubular conduit is generally provided with one or more fittings, such as an end fitting and/or stiffener, which generally have an outer diameter that is greater than the outer diameter of the flexible tubular conduit. As a result, a fitting located at the end of the flexible tubular conduit cannot easily navigate the guiding means in order to get the first end of the flexible tubular conduit vertically aligned with the firing line.

In cases where the first end of the flexible tubular conduit comprises a fitting attached thereto, the use of a deck crane or auxiliary winch is required in order to lift the fitting and position it downstream of the guiding means. This is because the fitting has a greater outer diameter than the flexible tubular conduit and as such cannot easily navigate the guiding means if just pulled by the initiation winch. Assistance of a vessel crane and men on the top of the laying tower is often required to guide the end fitting on the guiding means and to get it down the hole formed by the entrance of the upper tensioner.

U.S. Pat. No. 5,348,423 describes a method of laying a flexible tubular conduit according to the state of the art. A device is disclosed for laying flexible tubular conduits having a fitting, such as end fittings or the like, attached to the end thereof. The device comprises a main linear winch-type tensioning means for normal lowering of the flexible conduit to be laid and an auxiliary winch for lifting the fitting clear of the guiding means and into the tower when the outer diameter of the fitting is greater than the outer diameter of the conduit.

Hydrocarbons are now extracted from deeper seabed, and as a result there is a need to deploy longer lengths of flexible tubular conduit. Thus the capacity of the pipelay tower has to be increased.

To achieve this aim, larger tensioning means are required on the pipelay tower, for example moving from 1 or 2 tensioners to 3 or 4 tensioners within the tensioning means. This leads to an increase in the height of the pipelay tower as a tower having 4 tensioners will be almost twice the height of a tower having 2 tensioners.

In addition, as the flexible tubular conduit length increases, the end fitting becomes bigger and the stiffener becomes larger and longer in order to sustain the force exerted on it.

The need for bigger end fittings coupled with the increase in the height of the pipelay tower, means that methods currently known in the art are not very practical for transferring the fitting attached to the first end of the flexible tubular conduit over the guiding means. In particular, this would need a long boom vessel crane to reach the aligner reel and higher capacity crane. In addition assistance of men at this height for prolong periods of time is not recommended for safety reasons.

There is therefore a need for a transfer mechanism and method which facilitates the transfer of a fitting attached to the first end of the flexible tubular conduit over the guiding means in the deployment of longer lengths of flexible tubular conduits.

SUMMARY OF THE INVENTION

It is an object of the invention to provide an improved transfer mechanism and method for transferring a fitting attached to the end of a flexible tubular conduit about the guiding means of a pipelay tower.

According to a first aspect, there is provided a transfer mechanism for transferring a fitting on a flexible tubular conduit about a guiding means of a pipelay tower, said transfer mechanism comprising:

a frame adapted to rotate about said guiding means; and a clamping mechanism connected to the frame and adapted to connect and secure a fitting to the transfer mechanism, wherein actuation of the transfer mechanism is configured to rotate the frame about the guiding means and cause at least one part of a fitting connected to the transfer mechanism to move along a path outside a surface of the guiding means from a first position upstream of the guiding means to a second position downstream of the guiding means.

By means of the invention, the transfer of a fitting attached to the first end of the flexible tubular conduit over the guiding means in the deployment of longer lengths of flexible tubular conduits can be easily achieved.

In addition, a transfer mechanism in accordance with the invention removes or reduces the need for the use of a deck crane or an auxiliary winch to move the end fitting on a flexible tubular conduit from a first position upstream of the guiding means to a second position downstream of the guiding means, as required in methods currently known in the art.

In addition, a transfer mechanism in accordance with the invention does not necessitate the assistance of men working at elevated heights for prolong periods of time.

Another advantage of the transfer mechanism according to the invention is that the product minimum bending radius (MBR) of a flexible tubular conduit does not need to be exceeded at any time during the operation.

Preferably, the path outside the surface of the guiding means is within a vertical plane defined by the guiding means. This prevents any over bending of the fitting.

The transfer mechanism preferably further comprises actuation means for actuating the transfer mechanism. The actuation means may be any suitable device for rotating the frame about the guiding means. For example, the actuation means may be in the form of an electronic or hydraulic motor engageable with a large diameter ring gear attached to the frame.

Optionally, the clamping mechanism comprises a pair of jaws moveable between a first open position and a second closed position.

Optionally, the transfer mechanism further comprises an adapter for connecting the fitting to the clamping mechanism. In this way, the same clamping mechanism may be utilized to connect and secure fittings of different sizes and shapes to the transfer mechanism by means of the adapter.

In exemplary embodiments, the adapter comprises a clamp engaging portion for engagement with the jaws of the clamping mechanism.

The adapter may comprise an eyelet at an end for connecting the adapter to a cable. In this way, a cable may be connected to the adapter via the eyelet and actuated by the initiation winch to move the guiding means from a first position upstream of the guiding means to a second position downstream of the guiding means.

Preferably, the adapter is connectable to a fitting by one or more fasteners. The fasteners may be any suitable fasteners that may releasably connect the adapter to the fitting, for example bolts or the like.

In exemplary embodiments, the transfer mechanism further comprises a pulley proximate the clamping mechanism. The pulley may be used to guide a cable connected to the eyelet of the adapter at one end thereof and to the initiation winch at another end thereof.

According to a second aspect, there is provided a pipelay tower comprising:

a guiding means for passing a flexible tubular conduit in a vertical direction; and a transfer mechanism for transferring a fitting on a flexible tubular conduit about said guiding means, said transfer mechanism being coupled to said guiding means and comprising a frame adapted to rotate about said guiding means, wherein actuation of said transfer mechanism is configured to rotate the frame about the guiding means and cause at least one part of a fitting connected to the transfer mechanism to move along a path outside a surface of the guiding means from a first position upstream of the guiding means to a second position downstream of the guiding means.

Preferably, the transfer mechanism forming part of the second aspect of the invention is a transfer mechanism according to the first aspect of the invention.

The guiding means may be in any suitable form to facilitate the transfer of the flexible tubular conduit. For example, the guiding means may comprise an aligner, a chute or a wheel.

Preferably, the pipelay tower further comprises at least one tensioning means. The tensioning means may be in any suitable form as known in the art, for example, the tensioning means may comprise a pipe tensioner comprising one or more caterpillar tracks.

According to a third aspect, there is provided a pipelay vessel comprising a pipelay tower according to the second aspect of the invention.

In exemplary embodiments, the pipelay vessel comprises storage means for storing a flexible tubular conduit.

The storage means may be in any suitable form for storing flexible tubular conduits. Preferably, the storage means comprises a basket.

According to a fourth aspect, there is provided a method of transferring a fitting on a flexible tubular conduit about a guiding means of a pipelay tower, comprising the steps of:

(a) connecting a fitting on a flexible tubular conduit to a transfer mechanism comprising a frame adapted to rotate about said guiding means; and (b) actuating the transfer mechanism to rotate the frame about said guiding means such that at least one part of the fitting moves along a path outside a surface of the guiding means from a first position upstream of the guiding means to a second position downstream of the guiding means.

Preferably, the transfer mechanism is a transfer mechanism according to the first aspect of the invention.

BRIEF DESCRIPTION OF THE DRAWINGS

The invention will now be described by way of non-limiting example, with reference being made to the accompanying drawings, in which.

DESCRIPTION OF PREFERRED EMBODIMENTS

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, compounds described in conjunction with a particular aspect, embodiment or example of the invention are to be understood to be applicable to any other aspect, embodiment or example described herein unless incompatible therewith.

Figure 1:
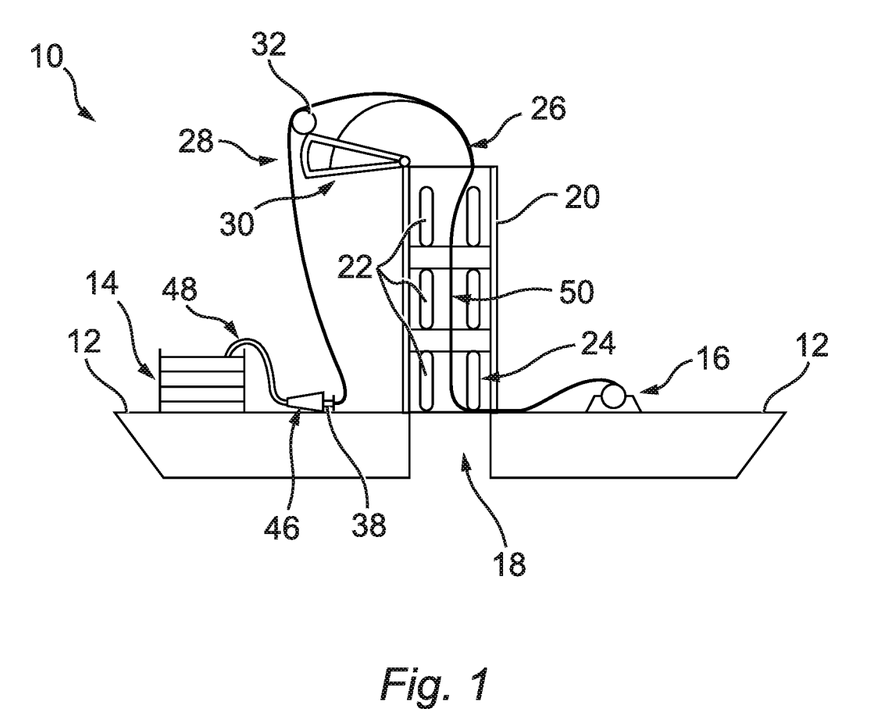
FIG. 1 is a schematic view of an embodiment of a pipelay vessel in accordance with an aspect of the invention.

Referring to FIG. 1, an embodiment of a pipelay vessel 10 in accordance with an aspect of the invention is shown.

The vessel 10 comprises a deck 12 on which is positioned a storage means 14 for storing a flexible tubular conduit 48, such as a flexible pipe, and an initiation winch 16. In the embodiment shown, the storage means 14 is in the form of a basket although it may take any suitable form. For example, the storage means 14 may comprise a reel.

The vessel 10 further comprises a moon pool 18 and an associated pipelay tower 20. The pipelay tower 20 is in the form of a vertical pipelay tower.

The pipelay tower 20 comprises at least one tensioning means 22 associated therewith. The at least one tensioning means 22 is provided to facilitate the feeding of a flexible tubular conduit, such as a flexible pipe, along the firing line for laying the flexible tubular conduit.

In the embodiment shown, the tensioning means 22 is in the form of pipe tensioners comprising one or more caterpillar tracks 24 as known in the art. While three tensioners are shown, it would be understood that the tensioning means 22 may comprise more or less than three tensioners.

Guiding means 26 are located on top of the pipelay tower 20 to facilitate the diversion of the flexible tubular conduit 48 from a horizontal path to a vertical path for laying. The guiding means 26 comprises a channel (not shown in FIG. 1) for receiving the flexible tubular conduit 48 therein. In the embodiment shown in FIG. 1, the guiding means 26 is in the form of a chute although it would be understood that the guiding means 26 may take any other suitable form, for example the guiding means 26 may be in the form of an aligner or a reel.

A transfer mechanism 28 is coupled the guiding means 26. The transfer mechanism 28 is configured to transfer a fitting 46 on the flexible tubular conduit 48 about the guiding means 26.

The transfer mechanism 28 comprises a frame 30 adapted to rotate about the guiding means 26. The frame 30 comprises a longitudinal length that is greater than a maximum radius of the guiding means 26. That is to say the longitudinal length of the frame 30 is greater than a distance defined by the length from the midpoint of the diameter of the guiding means 26 to a circumference of or outer boundary of the guiding means 26.

Where the transfer mechanism 28 is to be used to transfer fittings 46 of different lengths, the longitudinal length of the frame 30 is ideally the combination of the maximum length of the fitting to be used therewith and a radial offset. For example, if the fitting is in the form of an end fitting and attached bend stiffener assembly, the longitudinal length of the frame 30 will be the combination of the maximum length of the end fitting and attached bend stiffener assembly to be accommodated and the radial offset such that the extreme tapered end of the bend stiffener will be seated in the channel of the guiding means 26 during movement of the fitting from upstream to downstream of the guiding means 26.

Figure 2:
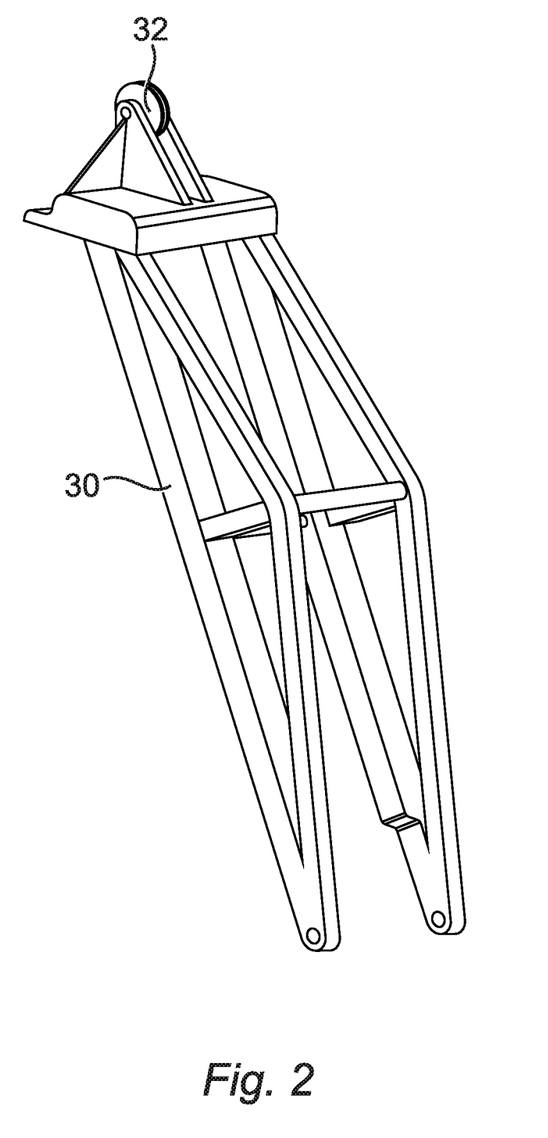
FIG. 2 is a perspective view of an embodiment of a frame forming part of a transfer mechanism in accordance with an aspect of the invention.

FIG. 2 depicts an embodiment of the frame 30 which is in the form of an A-frame like structure. The frame 30 is pivotably mounted to the guiding means 26 such that actuation of the transfer mechanism 28 is configured to rotate the frame 30 about the guiding means 26 and cause at least one part of a fitting 46 connected to the transfer mechanism 28 to move along a path outside a surface of the guiding means 26 from a first position upstream of the guiding means 26 to a second position downstream of the guiding means 26.

The transfer mechanism 28 further comprises actuation means (not shown) for actuating the transfer mechanism. The actuation means may be any suitable device for rotating the frame about the guiding means. For example, the actuation means may be in the form of an electronic or hydraulic motor engageable with a large diameter ring gear attached to the frame.

The transfer mechanism 28 further comprises a clamping mechanism 34 connected to the frame 30. The clamping mechanism 34 is adapted to connect and secure the fitting 46 to the transfer mechanism 28.

Figure 3:
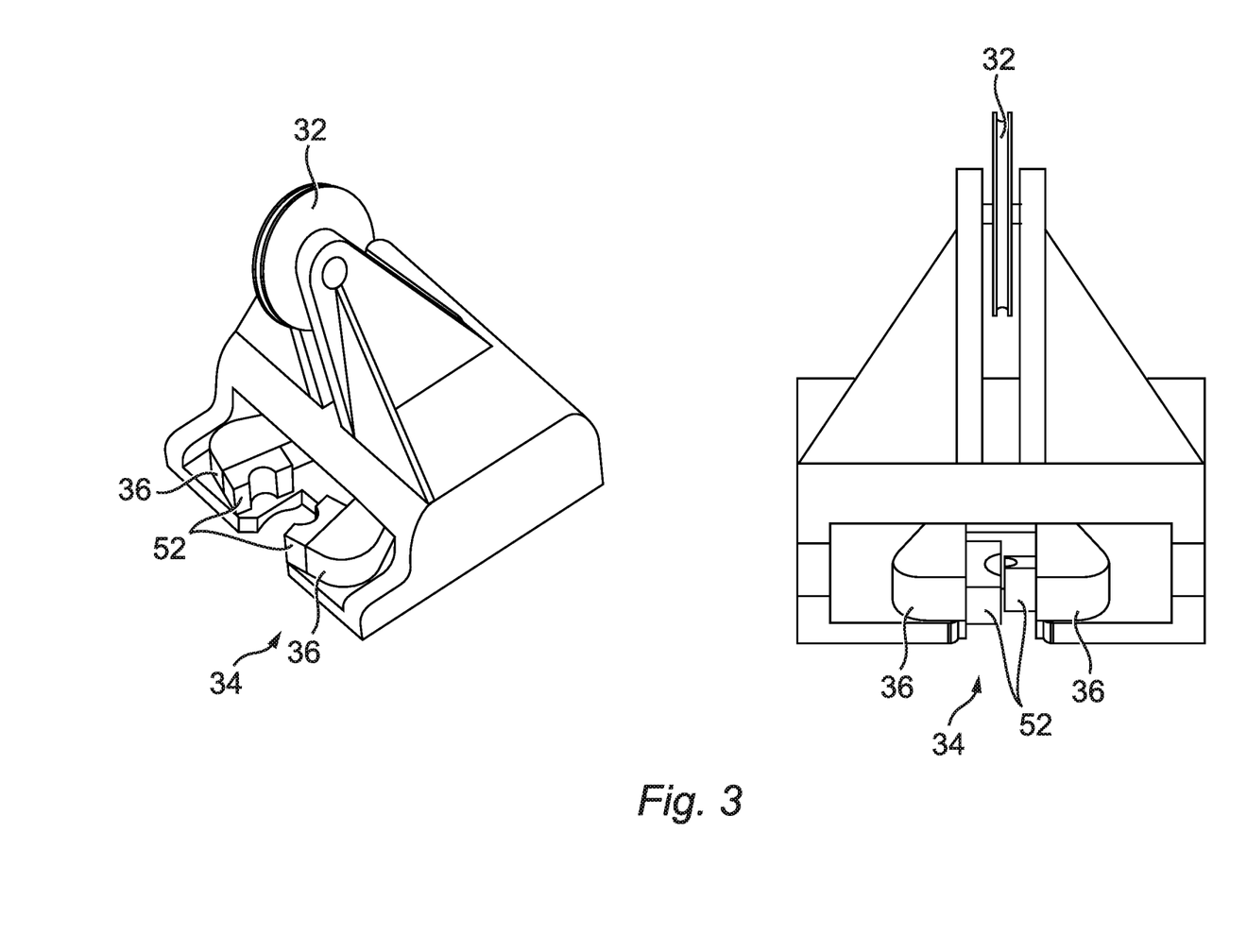
FIG. 3 is a perspective view of an embodiment of a clamp mechanism forming part of a transfer mechanism in accordance with an aspect of the invention.

Referring to FIG. 3, an embodiment of the clamping mechanism 34 is shown. The clamping mechanism 34 comprises a pair of jaws 36 moveable between a first open position and a second closed position.

Each jaw 36 comprises a clamp head 52 having a recess therein for engagement with a clamp engaging portion 42 of an adapter 38 for connecting the fitting 46 to the transfer mechanism 28 via the clamping mechanism 34.

Figure 4:
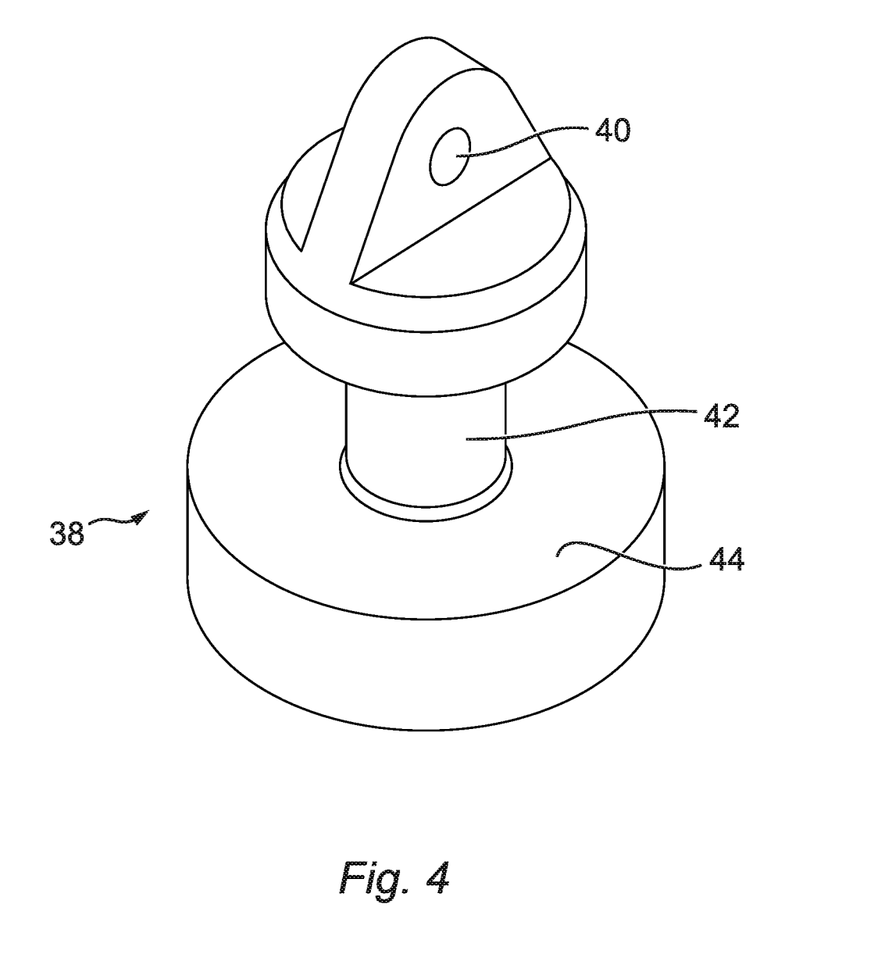
FIG. 4 is a perspective view of an embodiment of an adapter forming part of a transfer mechanism in accordance with an aspect of the invention.

Referring to FIG. 4, an embodiment of the adapter 38 is shown. The adapter 38 comprises a clamp engaging portion 42 for engagement with the clamp heads 52 of the jaws 36 of the clamping mechanism 34.

The adapter 38 further comprises an eyelet 40 at an end thereof for connecting the adapter 38 to a winch cable 50.

The adapter 38 comprises a flange portion 44 for connecting the adapter to the fitting 46 by means of one or more fasteners (not shown). The fasteners may be any suitable fastener known in the art, for example, the adapter 38 may be connected to the fitting 46 by means of bolts or a hub clamp.

The transfer mechanism 28 comprises a pulley 32 proximate the clamping mechanism which is adapted to receive a winch cable 50.

While not specifically described or shown, the pipelay vessel 10 may comprise one or more features which are commonly incorporated in pipelay vessels known in the art, for example work table(s), access platform(s) etc.

The method of transferring a fitting 46, in the form of an end fitting and attached bend stiffener (herein after referred to as "end fitting assembly" for simplicity), on a flexible tubular conduit 48 about the guiding means 26 of the pipelay tower 20 will now be described with particular reference to FIGS. 5a to 5f. Only the top portion of the pipelay tower 20 is shown for clarity. In FIGS. 5a to 5f the guiding means 26 is shown in the form of a reel. The flexible tubular conduit is in the form of a flexible pipe for conveying hydrocarbons.

A first end of the flexible tubular conduit 48 is first removed from the basket 14 and the end fitting assembly 46 connected thereto. It would be understood that the end fitting assembly 46 may be connected to the end of the flexible tubular conduit 48 prior to storage of the flexible tubular conduit 48 in the basket 14.

The adapter 38 is then connected to the end fitting assembly 46 by means of fasteners or a hub clamp. Again, the adapter 38 may be connected to the end fitting assembly 46 prior to storage of the flexible tubular conduit 48 in the basket 14.

The frame 30 is positioned in a substantially horizontal orientation and the winch cable 50 is then fed from the initiation winch 16 along the path of the firing line, over the guiding means 26, through the pulley 32 on the transfer mechanism 28 and to the deck of the vessel 10 where it is connected to the adapter 38, as shown in FIG. 1.

Once connected to the end fitting assembly 46, the winch cable 50 is then rewound by the initiation winch 16. As the winch cable 50 is wound in by the initiation winch 16, the end fitting assembly 46 will be lifted upwards and towards the guiding means 26.

Figure 5A:
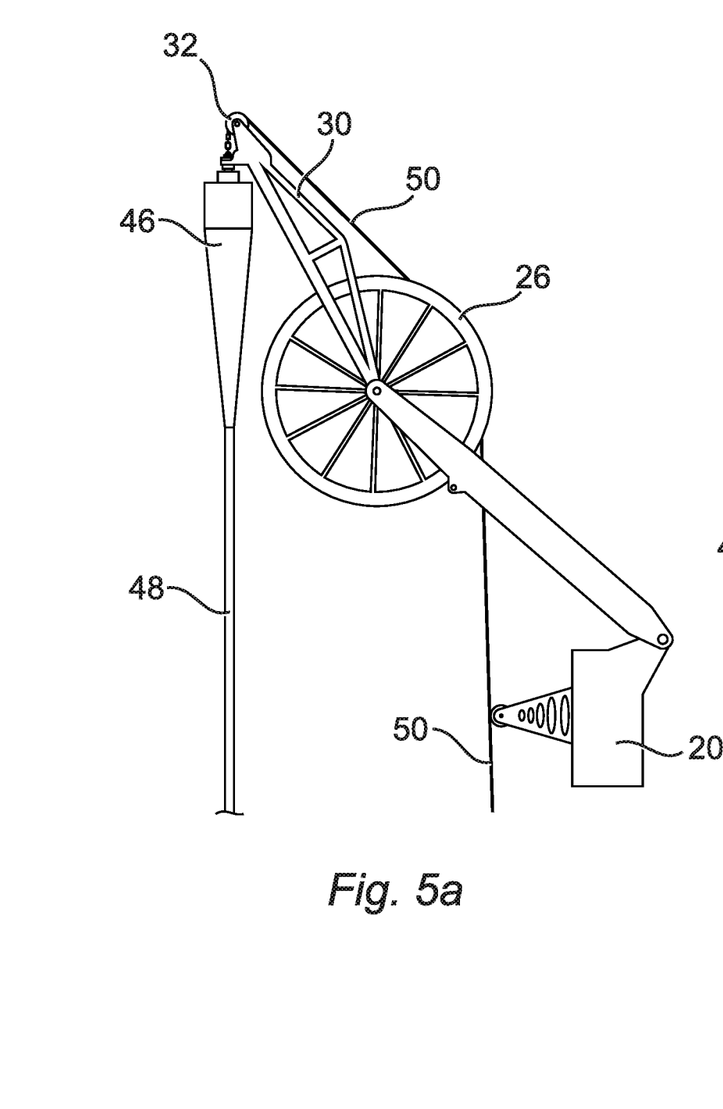
FIGS. 5a-5f are diagrammatic views of a method of transferring a fitting on a flexible tubular conduit about a guiding means of a pipelay tower in accordance with an aspect of the invention.
Figure 6A:
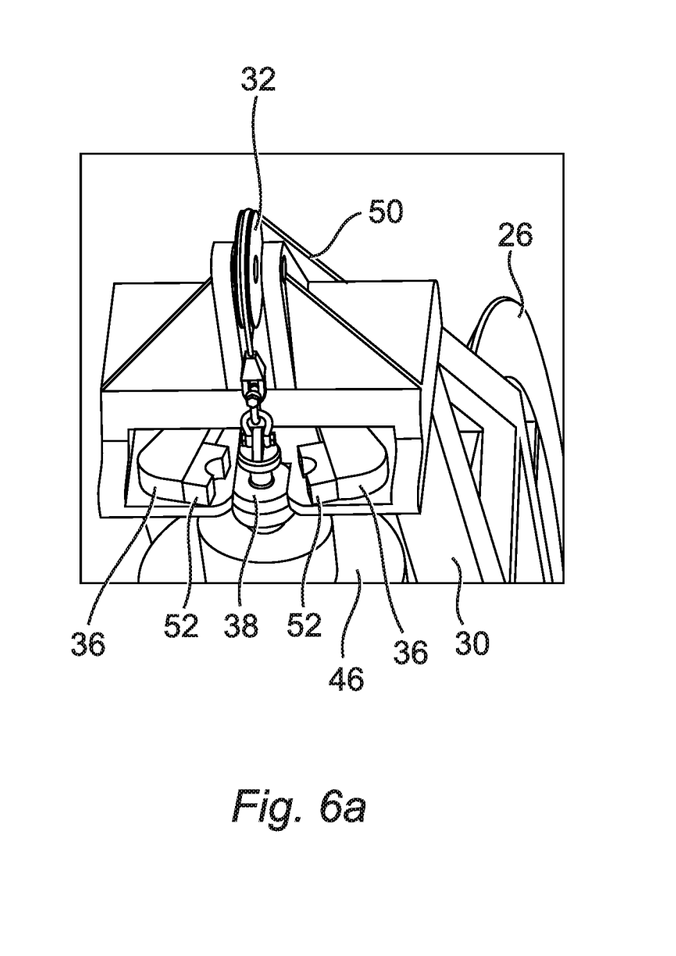
FIGS. 6a and 6b depict the connection of the fitting on an end of a flexible tubular conduit to the transfer mechanism in accordance with the invention.
Figure 6B:
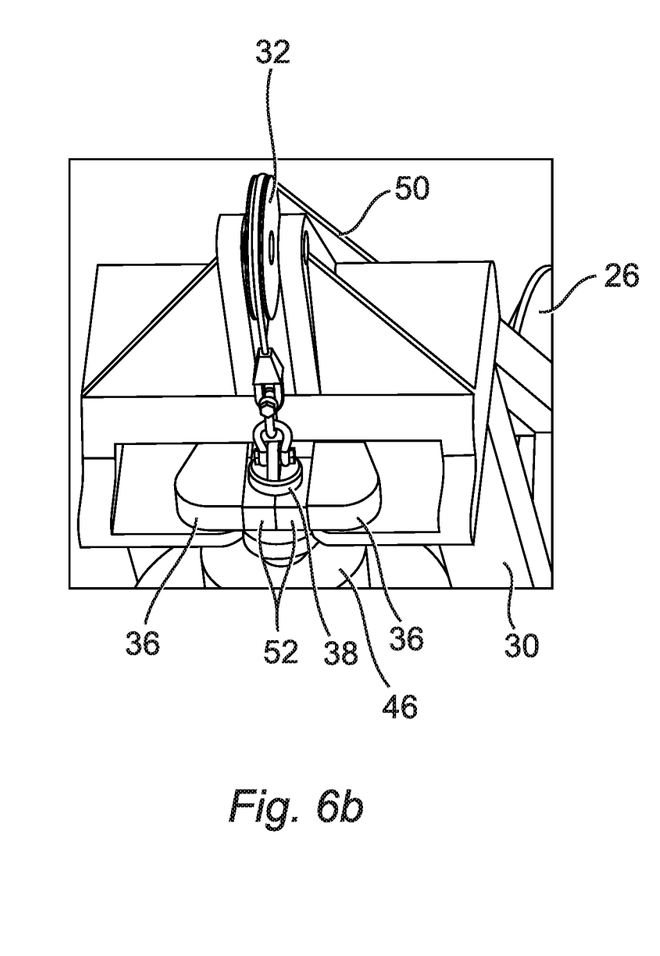

The end fitting assembly 46 will follow a substantially linear path and will engage with clamping mechanism 34 of the transfer mechanism 28 (see FIG. 5a). The clamping jaws 36 will then be moved from the first open position (as shown in FIG. 6a) to the second closed position (as shown in FIG. 6b) so that the clamp heads 52 engage with the clamp engagement portion 42 of the adapter 38 and the end fitting assembly 46 is connected and secured to the transfer mechanism 28.

Further rewinding of the winch cable 50 will pull the end fitting assembly 46 towards the initiation winch 16. As the end fitting assembly 46 is now connected to the transfer mechanism 28, the initiation winch is then set into constant tension mode and the end fitting assembly 46 will move with the frame 30.

The actuation means is initiated to cause the frame 30 to rotate about the guiding means 26.

Figure 5B:
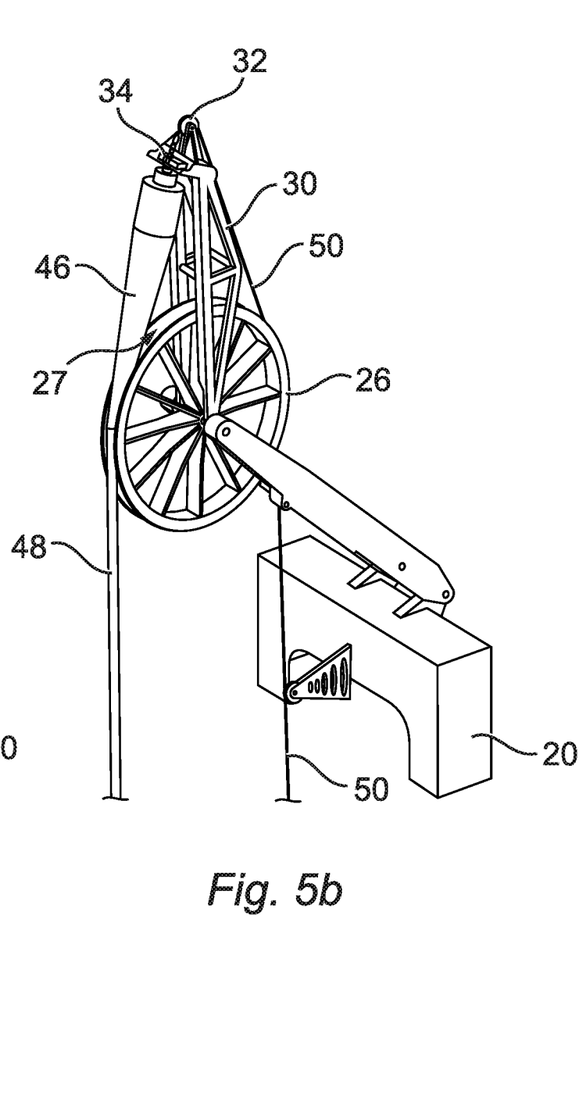
Figure 5C:
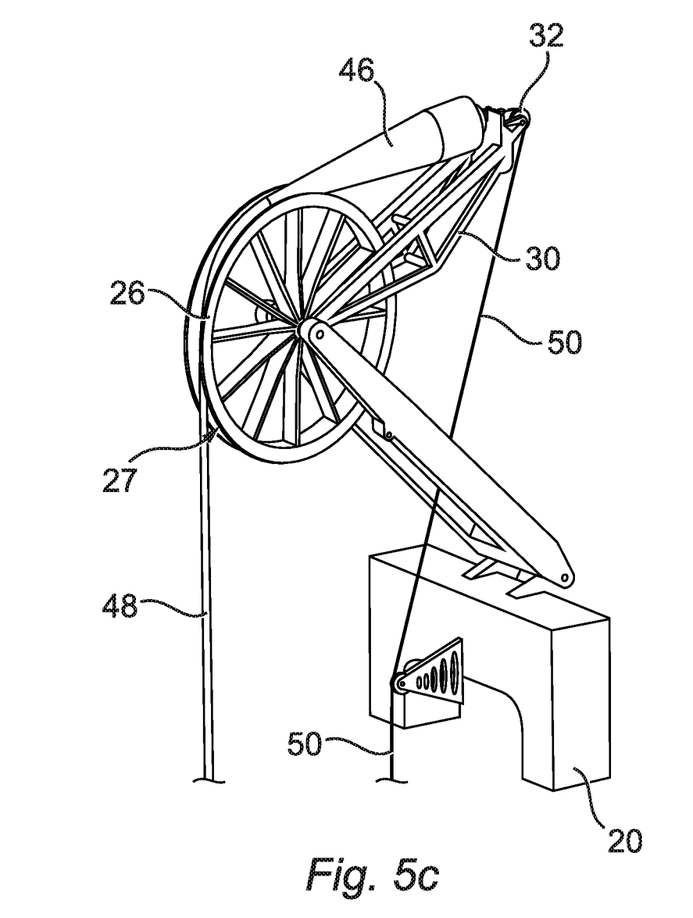
Figure 5D:
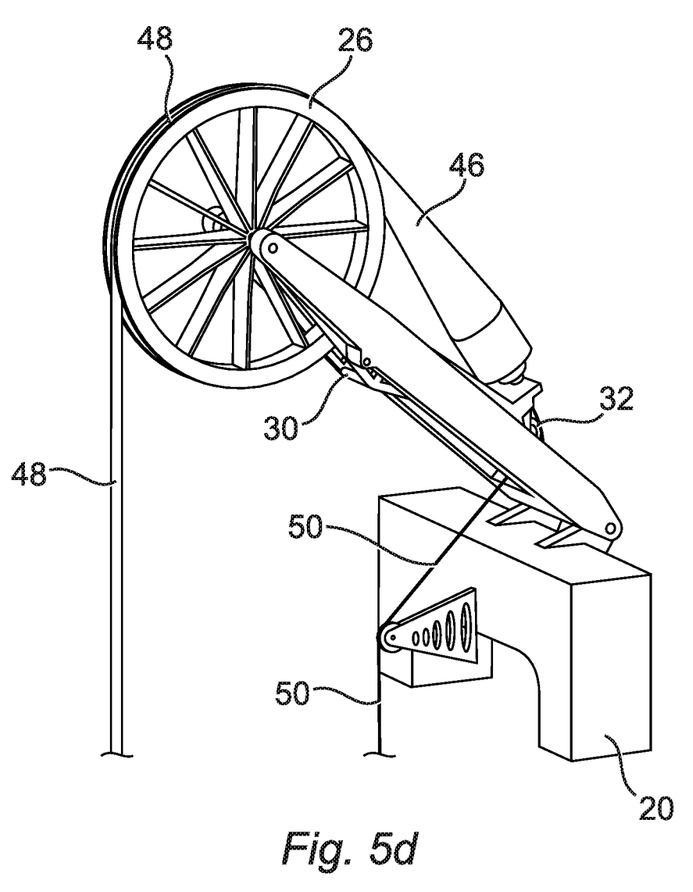
Figure 5E:
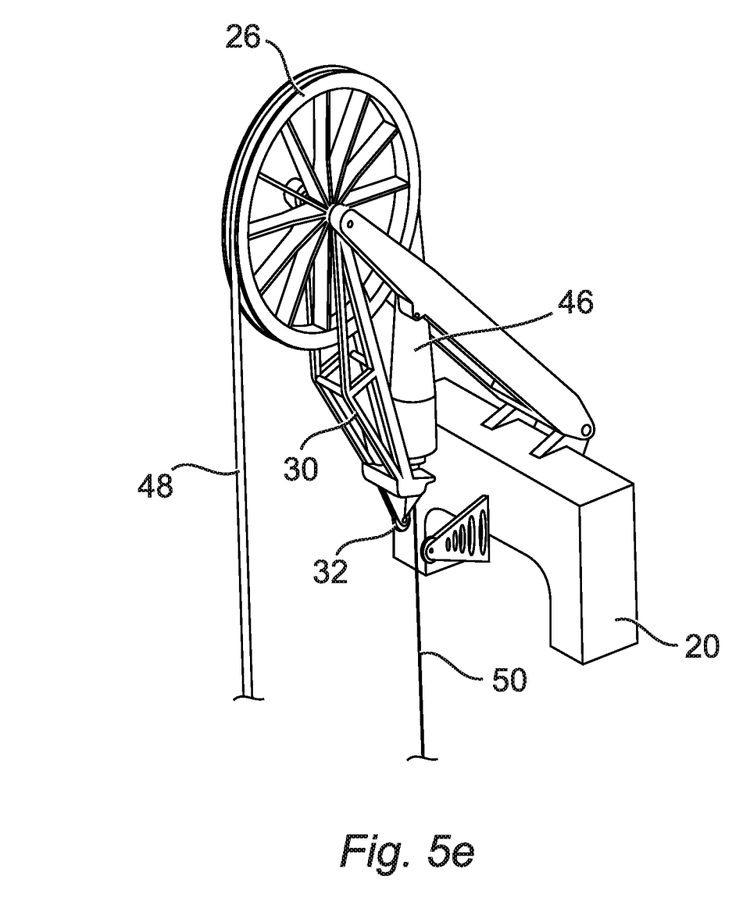
Figure 5F:
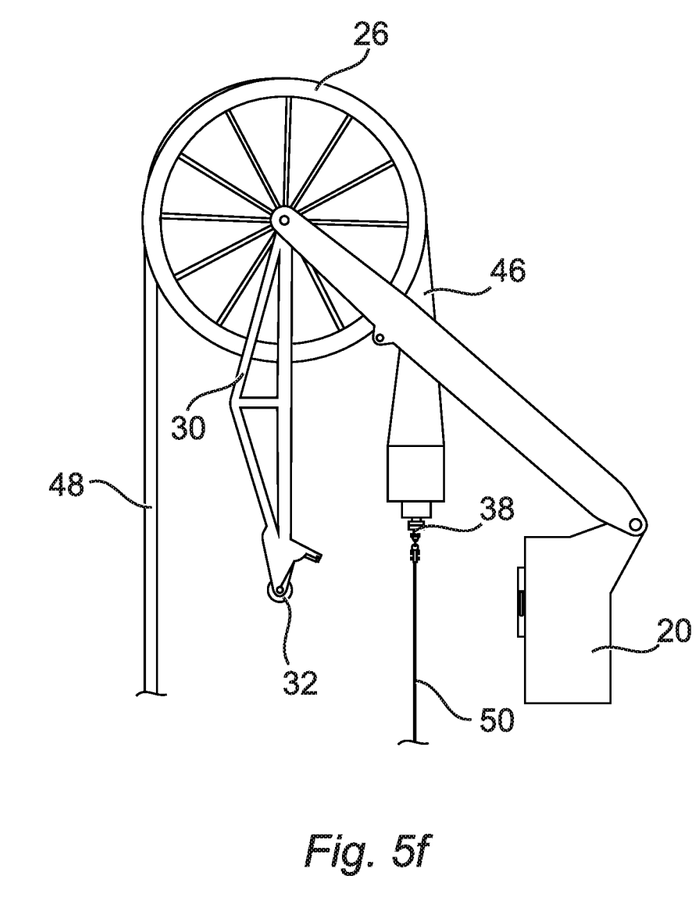

As the frame 30 rotates about the guiding means 26, it will cause at least one part of the end fitting assembly 46 to move along a path outside a surface of the guiding means 26 from a first position upstream of the guiding means 26 (as shown in FIG. 5a) to a second position downstream of the guiding means 26 (as shown in FIG. 5e). The path outside the surface of the guiding means 26 is within a vertical plane defined by the guiding means 26.

As can be seen in FIGS. 5b to 5d, the frame 30 ensures that only an end portion of the end fitting assembly 46 (the extreme tapered end of the bend stiffener) which is of similar outside diameter to the outside diameter of the flexible tubular conduit 48 travels along the channel 27 of the guiding means 26.

Figure 7A:
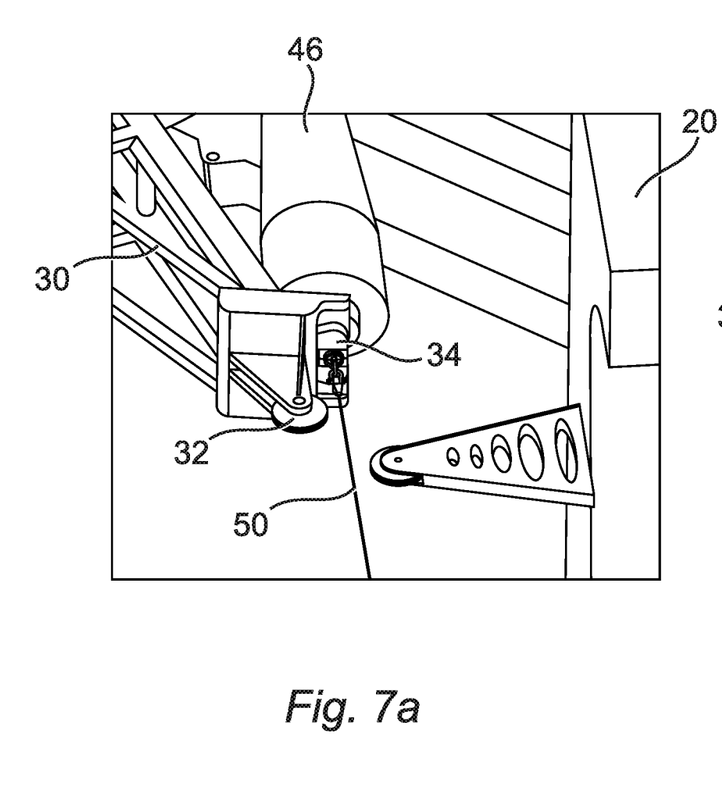
FIGS. 7a and 7b depict the release of the fitting on an end of the flexible tubular conduit from the transfer mechanism in accordance with the invention.
Figure 7B:
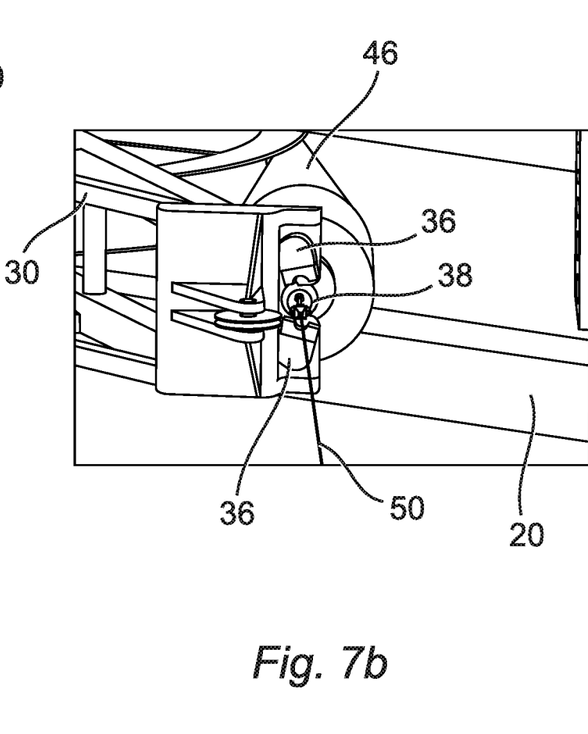

Once the end fitting assembly 46 is located downstream of the guiding means 26 and orientated in the vertical path of the firing line (see FIG. 5e), the clamping mechanism 34 is released to disengage the jaws 36 from the clamp engagement portion 42 of the eyelet (see FIGS. 7a and 7b). The frame 30 is parked and the load transferred back to the initiation winch, which is re-set into drive mode.

The end fitting 46 may then be moved along the firing line by the rewinding of the initiation winch 16 as known in the art. Once the end fitting is secured in the tensioners, the initiation winch can be removed.

While the invention has been described with reference to the laying of flexible tubular conduits in the form of flexible tubular conduits for conveying hydrocarbons, it would equally be applicable to the laying of other flexible tubular conduits, for example power cables, data cables etc.

While the invention has been described with reference to the utilization of an adapter to connect a fitting to the transfer mechanism, the clamping mechanism may be configured to clamp onto a portion of the fitting directly.

What is claimed is:

1. A pipelay tower comprising a top and extending upward from a pipelay vessel, the pipelay tower comprising:
    a guide comprising a chute positioned at the top of the pipelay tower and configured to convey a flexible tubular conduit from outside the pipelay tower to a vertical direction into the pipelay tower; and
    a transfer mechanism configured to transfer a fitting positioned on a free end of the flexible tubular conduit about the chute, said transfer mechanism being coupled to the chute and comprising a frame comprising a secured portion rotatably secured to a portion of the guide, such that the frame is positioned and configured to rotate fully about the portion of the guide,
    wherein actuation of said transfer mechanism is configured to rotate the frame about the chute and to cause a first part of the fitting connected to the transfer mechanism to move along a path outside a surface of the chute from a first position upstream of the chute to a second position downstream of the chute.

2. The pipelay tower according to claim 1, wherein the transfer mechanism further comprises a pulley.

3. The pipelay tower according to claim 1, wherein the pipelay tower further comprises at least one tensioning means.

4. The pipelay tower according to claim 1, further comprising a winch cable extending from within the pipelay tower.

5. The pipelay tower according to claim 1, further comprising a clamping mechanism connected to the frame and configured to connect and secure the fitting to the transfer mechanism.

6. The pipelay tower according to claim 5, wherein said clamping mechanism comprises a pair of jaws moveable between a first open position and a second closed position.

7. The pipelay tower according to claim 6, further comprising an adapter for connecting said fitting to the clamping mechanism.

8. The pipelay tower according to claim 7, wherein the adapter comprises a clamp engaging portion for engagement with the jaws of the clamping mechanism.

9. The pipelay tower according to claim 8, wherein the adapter comprises an eyelet at an end thereof for connecting the adapter to a cable.

10. The pipelay tower according to claim 7, wherein the adapter is connectable to a fitting by one or more fasteners.

11. The pipelay tower according to claim 1, wherein the guide comprises a reel configured to convey the flexible tubular conduit.

12. The pipelay tower according to claim 1, wherein the guide comprises a chute configured to convey the flexible tubular conduit.

13. A method of laying a flexible tubular conduit from a pipelay vessel using a pipelay tower extending upward from the pipelay vessel, and of transferring a fitting on a free end of the flexible tubular conduit about a guide at the top of the pipelay tower, the guide configured to convey the flexible tubular conduit, the method comprising:
  extending a winch cable from within the pipelay tower, around the guide, and toward the fitting, the fitting positioned outside of the pipelay tower;
  attaching the winch cable to the fitting;
  winding the winch cable to lift the fitting toward a transfer mechanism comprising a frame adapted to rotate about said guide;
  connecting the fitting to the transfer mechanism;
  actuating the transfer mechanism to rotate the frame about the guide so that at a first part of the fitting moves along a path outside a surface of the guide from a first position upstream of the guide to a second position downstream of the guide;
  releasing the fitting from the transfer mechanism; and
  further winding the winch cable to draw the fitting into the pipelay tower,
  wherein the frame is fully rotatable about the guide.

14. The method according to claim 13, further comprising clamping the fitting to the transfer mechanism using a pair of jaws moveable between a first open position and a second closed position.

15. The method according to claim 13, further comprising:
  supporting the guide at the top of the pipelay tower using two or more spaced arms;
  rotating the frame about the guide within the spaced arms.

16. The method according to claim 13, further comprising aligning the second position of the fitting downstream of the guide with a firing line of the pipelay tower.

17. The method according to claim 13, further comprising actuating the transfer mechanism to rotate the frame about the guide so that at a part of the fitting moves along a path outside a surface of the guide from a first vertical position upstream of the guide to a second vertical position downstream of the guide.

18. The method according to claim 13, wherein the guide comprises a reel configured to convey the flexible tubular conduit.

19. The method according to claim 13, wherein the guide comprises a chute configured to convey the flexible tubular conduit.

* * * * *